(12) United States Patent
Hayashi et al.

(10) Patent No.: US 6,835,494 B2
(45) Date of Patent: Dec. 28, 2004

(54) COVER FOR SECONDARY BATTERY

(75) Inventors: Toshiharu Hayashi, Osaka (JP);
Masaaki Fukumoto, Osaka (JP);
Tomohiro Kato, Osaka (JP)

(73) Assignee: Wako Electronics Co., Ltd., Osaka (JP)

( * ) Notice: Subject to any disclaimer, the term of this patent is extended or adjusted under 35 U.S.C. 154(b) by 185 days.

(21) Appl. No.: 09/987,385

(22) Filed: Nov. 14, 2001

(65) Prior Publication Data

US 2002/0058184 A1 May 16, 2002

(30) Foreign Application Priority Data

Nov. 14, 2000 (JP) .................................. 2000-346407

(51) Int. Cl.[7] .............................................. H01M 2/08
(52) U.S. Cl. ........................ 429/180; 429/181; 429/185
(58) Field of Search ................................ 429/180, 181, 429/185

(56) References Cited

U.S. PATENT DOCUMENTS 5,586,993 A * 12/1996 Saito ........................ 29/623.2
6,132,900 A * 10/2000 Yoshizawa ................. 429/185
6,168,879 B1 * 1/2001 Kim ............................ 429/61

FOREIGN PATENT DOCUMENTS

JP 11-167909 * 6/1999 ............ H01M/2/04

* cited by examiner

Primary Examiner—Mark Ruthkosky
(74) Attorney, Agent, or Firm—Wenderoth, Lind & Ponack, L.L.P.

(57) ABSTRACT

By using a rivet which serves also as a terminal member, and a sealing member which serves also as an insulating member, the terminal member and the insulating member can be omitted, thereby forming the lid of the secondary battery from only three parts, i.e. the body, rivet and sealing member. The sealing member includes a cylindrical portion and a flange portion which are separate members. The cylindrical portion is formed by cutting a fluororesin tube. The flange portion is formed by punching a polypropylene resin sheet. Thus, the number of parts can be reduced to four, so that it is possible to reduce the parts cost and manufacturing cost as compared to conventional lids.

4 Claims, 3 Drawing Sheets

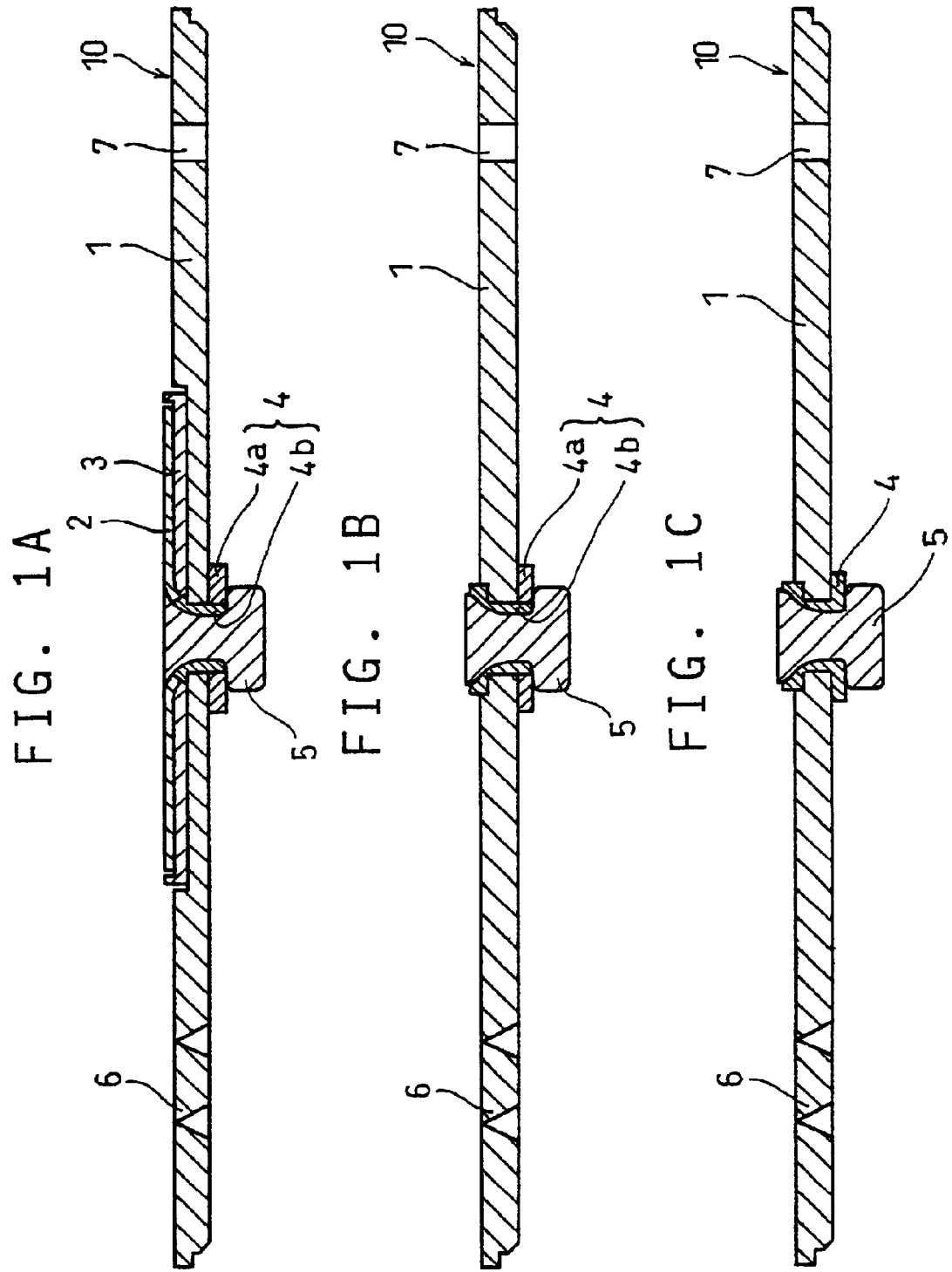

COVER FOR SECONDARY BATTERY

BACKGROUND OF THE INVENTION

The present invention relates to a secondary battery, and more particularly to an improved type thereof which can be manufactured inexpensively.

The increased prevalence of cellular phones is an eye-opener. As power sources of such cellular phones, lithium ion batteries are typically used in place of nickel-cadmium batteries and nickel-hydrogen batteries.

Since lithium ion batteries are higher in working voltage and larger in energy capacity as compared to nickel-cadmium batteries, they are durable and have such electrical properties that they are less likely to deteriorate due to additive charging. Further, lithium ion batteries are lightweight. Due to these properties, lithium ion batteries are advantageous for use in light, thin, short and small devices such as cellular phones and video cameras.

But, while lithium ion batteries have the above-described advantages, a problem is that they are expensive.

An object of the present invention is to provide a lithium ion battery which is less expensive than the conventional lithium ion battery.

SUMMARY OF THE INVENTION

In order to solve the above object, the structure of a lid of a lithium ion battery has been improved in the present invention so that it can be manufactured at a low cost to thereby reduce the cost of the entire lithium ion battery. First, referring to FIGS. 2 and 3, the structure of the lid of a conventional square-shaped lithium ion battery will be described.

The lid 10 of the square-shaped lithium ion battery shown in FIG. 2 has a body 1 formed of an iron plate plated with aluminum or nickel, and has a rectangular shape corresponding to the shape of a housing on which it is placed. To the center of the body 1, a rectangular terminal member 2 for mounting a lead wire is joined by a rivet 5 through a sealing member 4 together with an insulating member 3 slightly bigger than the terminal member 2. In the figures, thin-wall portions 6 of the body 1 function as a safety valve if the internal pressure of the housing rises. A hole 7 is provided to pour an electrolyte.

Next, a combined form of these parts of the lid 10 is described with reference to FIG. 3, which is an exploded perspective view.

As shown in FIG. 3, a hole 1a for mounting the terminal member 2 and the insulating member 3 is formed at the center of the body. Through-holes 2a and 3a are also formed in the center of the terminal member 2 and the insulating member 3, respectively, to mount the terminal member 2 and the insulating member 3 to the body 1.

The sealing member 4 mounts the terminal member 2 and the insulating member 3 to the body 1 and is a cylinder having an outward flange at one end thereof. A cylindrical portion 4b has such an outer diameter as to be fitted in the mounting hole 1a at the center of the body 1. The sealing member 4 is formed by injection-molding a polypropylene resin. Such members are mounted to the body 1 in the manner described below.

First, as shown in FIG. 3, the terminal member 2 and the insulating member 3 are superposed with the insulating member 3 under the terminal member 2 so that the centers of their respective through-holes 2a and 3a will align. Then, the terminal member 2 and the insulating member 3 are placed on the body 1 with the centers of the respective through-holes 2a, 3a of these members 2, 3 aligned with the center of the mounting hole 1a at the center of the body 1.

Next, the cylindrical portion 4b of the sealing member 4 is inserted into the through-holes 1a, 2a and 3a of the three members from the back of the body 1. The rivet 5 is then inserted into the cylindrical portion 4b of the sealing member 4 from the back of the body 1 and joined by caulking. Now the cover 10 is in the state shown in FIG. 2.

A lead wire (not shown) is mounted by welding the lead wire to the surface of the terminal member 2, which has thus been mounted to the body 1. In order to ensure welding, the terminal member 2 requires an area having a large occupying rate relative to the body 1 as shown in the figure.

Due to advancements of welding technology, however, it became possible to reduce the required area to be welded to a value substantially equal to the area of the end face of the rivet 5 after caulking.

Thus, by using the rivet 5 as the terminal and welding lead wire to the rivet, the terminal member 2 can be omitted. This makes it possible to manufacture the lid 10 at a low cost due to a reduction in the number of parts.

Thus, in the present invention, the rivet 5 is also used as the terminal member 2 to reduce the number of parts to four.

Further, by making the sealing member 4 an insulating material and using it also as the insulating member 3, it is possible to further reduce the number of parts to three (see FIGS. 1B and 1C).

Moreover, according to the present invention, the sealing member 4 may consist of a cylindrical portion 4b and flange portion 4a (FIGS. 1A and 1B). Advantages of this arrangement will be described below.

Heretofore, the insulating member 3 was, as described above, formed by injection molding of inexpensive polypropylene resin. But if the housing is made thin to reduce the size (thickness) of the battery, the influence of heat produced in welding the housing and the lid 10 together increases, so that the propropylene resin, which is inferior in heat resistance, cannot withstand the heat. Thus, it was impossible to reduce the size. Instead of polypropylene resin, using a fluororesin, which is superior in heat resistance, is considered.

But a fluororesin is not only expensive but is also difficult to injection mold, so that in order to perform injection molding, a special grade one has to be used. Thus, the cost is high as compared with other materials.

In the present invention, the sealing member 4 comprises the cylindrical portion 4b and the flange portion 4a, as shown in FIGS. 1A and 1B, which are separate from each other and simple in shape.

With this arrangement, disks for such simply shaped cylindrical portion 4b and flange portion 4a can be manufactured by punching or extruding a sheet material. Such work is inexpensive in cost. Thus, a fluororesin may be used, which is expensive but superior in heat resistance, it is possible to obtain a product more inexpensive than conventional in the end.

Also, in the entire sealing member 4, the flange portion 4a is a portion for which high sealability is not as required as it is for the cylindrical portion 4b but insulating properties are mainly required for the flange portion 4a. Thus, even if the flange portion 4a is deformed under the influence of heat buildup during welding, this will pose no significant problem. Thus, the flange portion 4a may be formed, not from an expensive fluororesin, but from a sheet member of inexpensive polypropylene resin by inexpensive punching. This further reduces the manufacturing cost of the lithium ion battery.

The above description has been made with reference to a lithium ion battery. But this invention is not limited to lithium ion batteries but is applicable to other secondary batteries such as nickel-cadmium batteries and nickel-hydrogen batteries if the lid has the same structure for the connection of the lead wires.

Other features and objects of the present invention will become apparent from the following description made with reference to the accompanying drawings, in which:

BRIEF DESCRIPTION OF THE DRAWINGS

FIGS. 1A, 1B and 1C are sectional views of lids of first, second and third embodiments of the present invention;

DETAILED DESCRIPTION OF THE PREFERRED EMBODIMENT

Figure 2A:
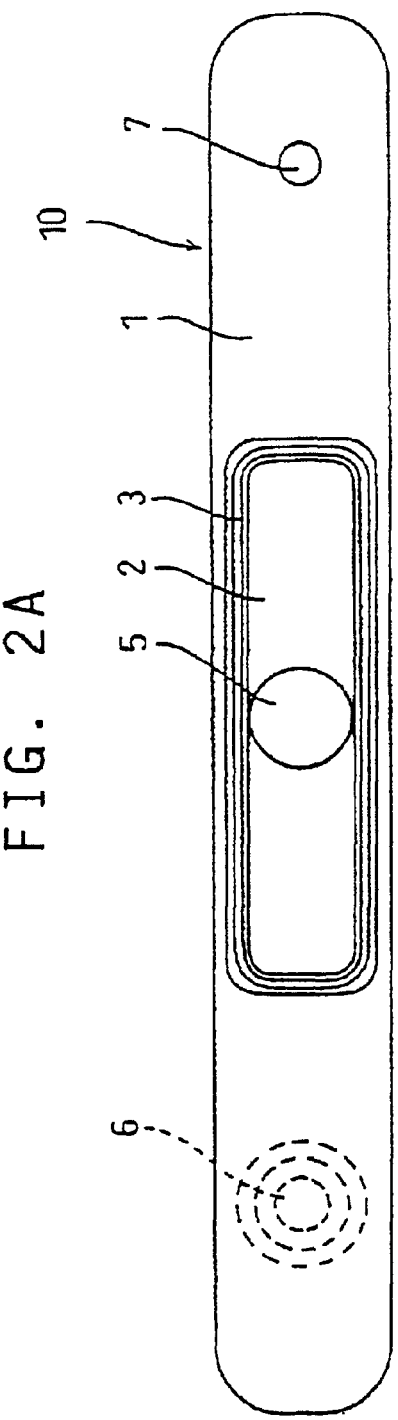
FIG. 2A is a plan view of a conventional lid.
Figure 2B:
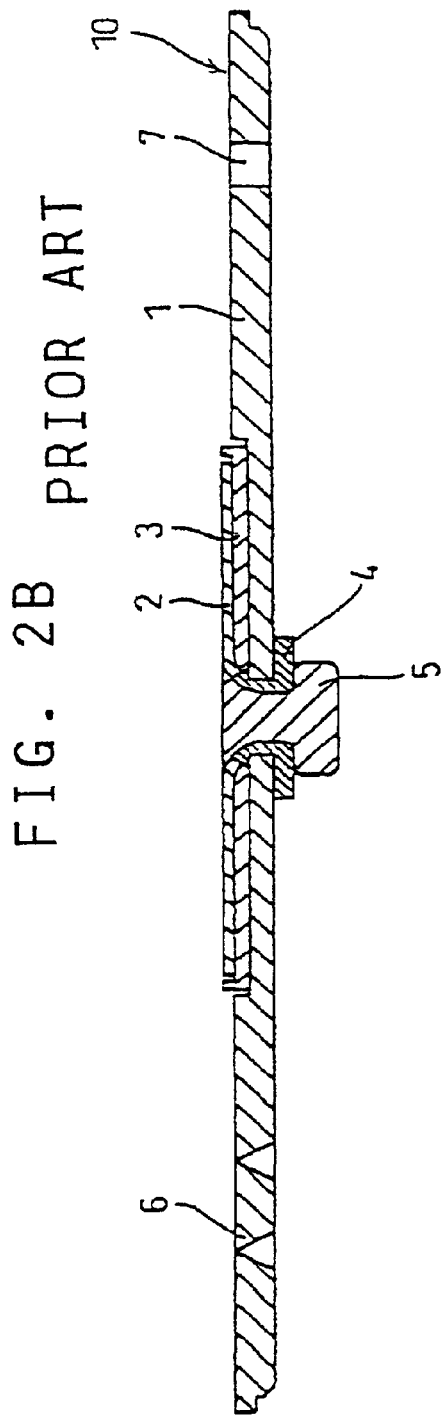
FIG. 2B is a sectional view of the conventional lid.
Figure 3:
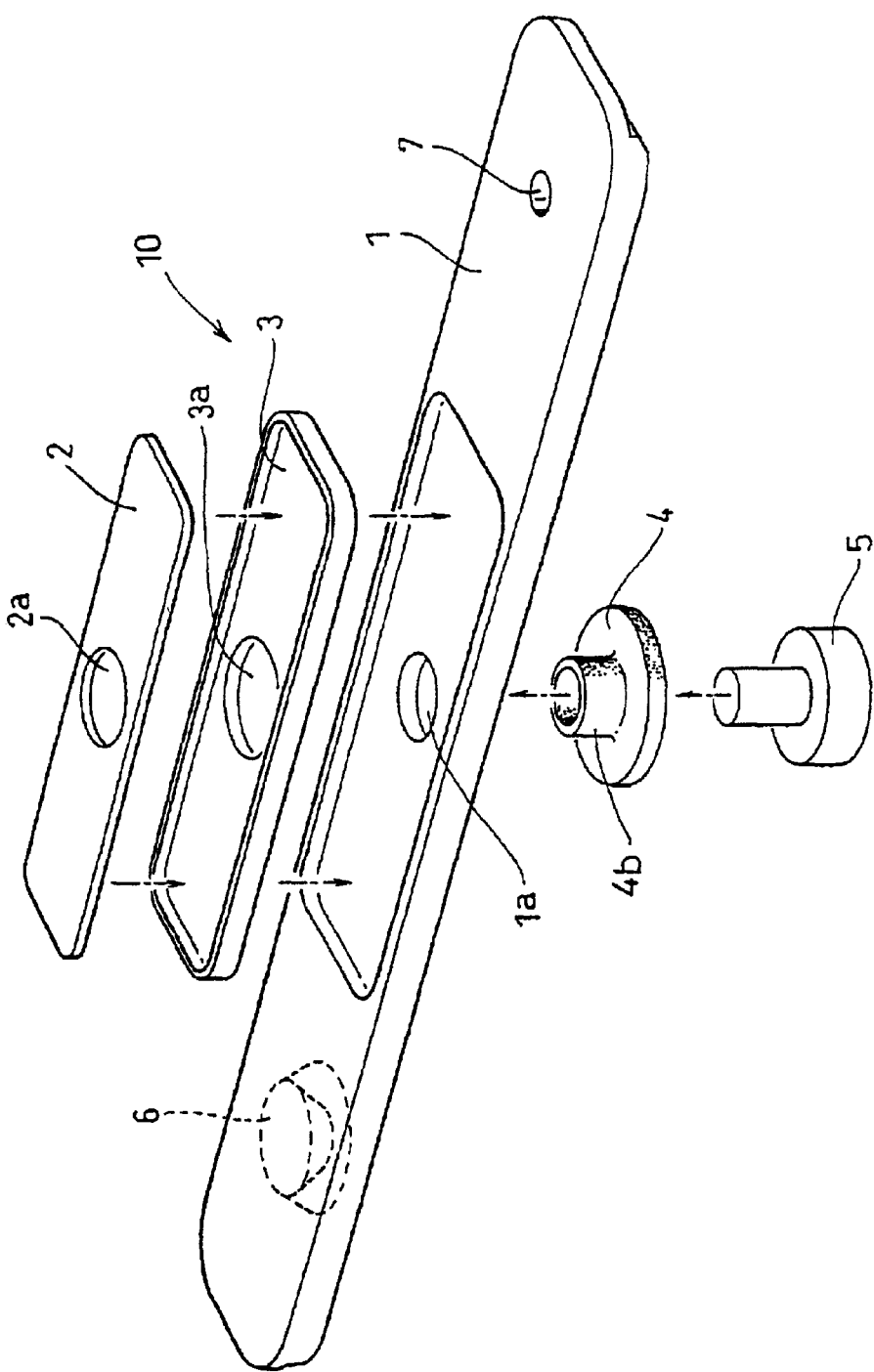
FIG. 3 is an exploded perspective view of the conventional lid.

Hereinbelow, referring to the drawings, the embodiments of the present invention will be described. For parts identical to those of the conventional lid, identical numerals are used and the description thereof is omitted. In the figures, lead wires connected to the lid are not shown.

First Embodiment

The embodiment shown in FIG. 1A is a lid 10 having a conventional terminal member 2 and an insulating member 3. The sealing member 4, however, has a cylindrical portion 4b and a flange portion 4a formed separately from each other.

For the cylindrical portion 4b for which sealability is especially required, a fluororesin is used which is, though expensive, superior in heat resistance and is less likely to be deformed even when exposed to heat buildup during welding. It may be formed by cutting a tube made therefrom.

On the other hand, the flange portion 4a for which insulating properties are mainly required, but for which slight deformation is permitted, is formed from an inexpensive polypropylene by punching a sheet member formed therefrom into a doughnut-shaped disk.

Because for both the cylindrical portion 4b and flange portion 4a, ready-made resin tubes and plates are used without using a complicately shaped molds, it is possible to manufacture them at a lower cost than a sealing member 4 having the cylindrical portion 4b and flange portion 4a integral with each other.

Second Embodiment

In the embodiment shown in FIG. 1B, by using the rivet 5 which serves also as the terminal member 2, and the sealing member 4 which serves also as the insulating member 3, the terminal member 2 and insulating member 3 are omitted to form the lid 10 from only three parts, i.e. the body 1, solid rivet 5 and sealing member 4.

For the sealing member 4, as with the first embodiment, the cylindrical portion 4b and flange portion 4a are formed as separate elements. The cylindrical portion 4b is formed by cutting a fluororesin tube, and the flange portion 4a is formed by punching a polypropylene sheet member.

Since this embodiment has no terminal member 2 or insulating member 3, the parts cost and manufacturing cost are less expensive.

Third Embodiment

In the embodiment shown in FIG. 1C, instead of splitting the sealing member 4 into the cylindrical portion 4b and flange portion 4a as in the second embodiment, an integral sealing member 4 is used, which is formed by injection molding.

As described above with regard to the second embodiment and which can be seen in FIG. 1C, the rivet 5 serves as the terminal member 2, and the sealing member 4, being integrally formed, serves as the insulating member 3. Accordingly, similar to the second embodiment, the third embodiment of the present invention omits both the terminal member 2 and the insulating member 3.

Further, by the arrangement according to the third embodiment, the number of parts is smaller than in the second embodiment, and can be reduced to only three, i.e. the lid body 1, rivet 5 and sealing member 4. Assembly is thus simplified.

But since a complicated shape having the cylindrical portion 4b and flange portion 4a integral with each other cannot be manufactured by extrusion molding, it is formed by injection molding. As described above, in this method, instead of using a fluororesin, which increases the cost, a polypropylene is used.

Thus, since a polypropylene resin is inferior in heat resistance to a fluororesin, in order for heat to be dispersed to the surroundings, this embodiment is applicable to one in which the lid body 1 has larger dimensions, such as its width and length, as compared with the dimensions of the second embodiment.

The structure of the lid 10 of each embodiment is, as described above, applicable to a nickel-cadmium battery, nickel-hydrogen battery or any other secondary battery. In view of the structure thereof, lids of these type of batteries can also be manufactured less expensively than the cost for manufacturing conventional lids.

In this invention, since the lid of a secondary battery is structured as described above, the secondary battery can be manufactured at a lower cost than the conventional secondary battery.

What is claimed is:

1. A lid of a secondary battery, said lid comprising:
   a plate-shaped body having a hole formed therein;
   a terminal member;
   an insulating member, said terminal member and said insulating member being superposed on a peripheral edge of the hole formed in said body with said insulating member being arranged under said terminal member;
   a sealing member having a flange portion at one end thereof and inserted in the hole formed in said body, said sealing member consisting essentially of a flat plate portion having a hole to form said flange portion, and said sealing member consisting essentially of a cylindrical portion that is separate from said flange portion; and
   a rivet inserted in said sealing member and caulked in order to join said terminal member and said insulating member to said body.

2. The lid of a secondary battery in accordance with claim 1, wherein said cylindrical portion is made of a fluororesin.

3. A lid of a secondary battery, said lid comprising:

a plate-shaped body having a hole formed therein;

a terminal member;

an insulating member, said terminal member and said insulating member being superposed on a peripheral edge of the hole formed in said body with said insulating member being arranged under said terminal member;

a sealing member having a flange portion at one end thereof and inserted in the hole formed in said body, said sealing member comprising a substantially flat plate portion having a hole to form said flange portion, and a substantially cylindrical portion that is separate from said substantially flat plate portion of said sealing member; and a rivet inserted in said sealing member and caulked in order to join said terminal member and said insulating member to said body.

4. The lid of a secondary battery in accordance with claim 3, wherein said cylindrical portion is made of a fluororesin.

* * * * *